United States Patent [19]
Uchida

[11] Patent Number: 5,630,386
[45] Date of Patent: May 20, 1997

[54] INTAKE STRUCTURE FOR V-TYPE ENGINE

[75] Inventor: Masahiro Uchida, Iwata, Japan

[73] Assignee: Yamaha Hatsudoki Kabushiki Kaisha, Iwata, Japan

[21] Appl. No.: 363,411

[22] Filed: Dec. 23, 1994

[30] Foreign Application Priority Data

Dec. 29, 1993 [JP] Japan .................. 5-353187

[51] Int. Cl.⁶ .................................................. F02M 35/10
[52] U.S. Cl. .................. 123/184.34; 123/184.53
[58] Field of Search ............... 123/184.34, 184.47, 123/184.53, 184.42

[56] References Cited

U.S. PATENT DOCUMENTS

| | | | |
|---|---|---|---|
| 2,382,244 | 8/1945 | Lundquist et al. | 123/184.34 |
| 2,845,911 | 8/1958 | Gill | 123/184.34 |
| 3,520,284 | 7/1970 | Ruoff et al. | 123/184.34 |
| 4,445,466 | 5/1984 | Zaita et al. | 123/184.32 |
| 4,641,610 | 2/1987 | Rutschmann | 123/184.57 |
| 4,643,138 | 2/1987 | Ruf et al. | 123/184.34 |
| 5,005,532 | 4/1991 | Shillington | 123/184.61 |
| 5,063,885 | 11/1991 | Yoshioka | 123/184.34 |
| 5,127,371 | 7/1992 | Ogawa et al. | 123/184.34 |
| 5,203,299 | 4/1993 | Ueda | 123/432 |
| 5,477,823 | 12/1995 | Uchida | 123/432 |

*Primary Examiner*—David A. Okonsky
*Attorney, Agent, or Firm*—Knobbe, Martens, Olson & Bear LLP

[57] ABSTRACT

An induction system for a V-type engine that is comprised of a plenum chamber that is disposed within the valley between the cylinder banks but spaced therefrom for cooling purposes. The plenum chamber serves the engine combustion chambers through a plurality of intake pipes that extend from the plenum chamber to the intake ports of the respective cylinder heads. The intake pipes are also spaced from each other so as to accommodate a cooling air flow.

25 Claims, 11 Drawing Sheets

INTAKE STRUCTURE FOR V-TYPE ENGINE

BACKGROUND OF THE INVENTION

This invention relates to an intake structure for a V-type engine and more particularly to an improved tuned induction system for such engines.

It has been the general practice with V-type engines to position the induction system at least in part in the valley between the cylinder banks. This provides a generally compact engine construction. However, there are some disadvantages with such an arrangement, particularly where the induction system is of the tuned or variable tuned type.

Because of the fact that the induction system is so instrumental in determining the performance of the engine and since conventional induction systems are designed primarily to serve most efficiently one engine speed or load range, it has been proposed to use so-called variable induction systems. These systems provide an effective length for the intake passages that serve each chamber which can be varied during engine running so as to be tuned for a wider range of speed and load conditions.

One way in which this is done is to provide at least two different length intake passages that serve each combustion chamber. The flow through these different length intake passages is controlled by a throttle control type of arrangement so that the effective length of the intake passage will conform to the optimum length for any given engine running condition.

These flow controlling throttle valves are in addition to the main flow control throttle valve which controls the total air flow through the system. In order to simplify the construction, it has been proposed to provide a common plenum chamber that is disposed in the valley between the cylinder banks and into which all of the intake pipes of the various lengths extend. This common plenum chamber has a common air inlet in which the main throttle valve for the engine is positioned. It should be readily apparent that this type of construction is very complex and places a large volume of components in the valley between the cylinder banks.

This type of arrangement places a large volume of the intake system in an area where a large amount of heat is also generated by the engine. Therefore, this type of induction system can experience deteriorated volumetric efficiency when operating at high temperatures.

It is, therefore, a principal object of this invention to provide an improved intake system for a V-type engine.

It is a further object of this invention to provide a tuned intake system for a V-type engine that is positioned in the valley between the cylinder banks but which will be adequately cooled and yet serve its intended purposes.

SUMMARY OF THE INVENTION

This invention is adapted to be embodied in an induction system for an engine having a pair of angularly disposed cylinder banks each having at least two cylinder bores formed therein. The cylinder banks define a valley therebetween. Each cylinder bank has a plurality of intake ports for the cylinder bores therein which intake ports are formed adjacent the valley. A plenum chamber extends longitudinally through the valley and is spaced from the cylinder banks for forming a cooling air flow path therebetween. A first series of intake pipes extend from the intake ports of one of the cylinder banks into the plenum chamber and a second series of intake pipes extend from the intake ports of the other of the cylinder banks into the plenum chamber. The intake pipes are all spaced from each other for providing a cooling air flow path therebetween.

BRIEF DESCRIPTION OF THE DRAWINGS

FIG. 12 is a front elevational view of the manifold section shown in FIG. 11.

DETAILED DESCRIPTION OF THE PREFERRED EMBODIMENTS OF THE INVENTION

Figure 1:
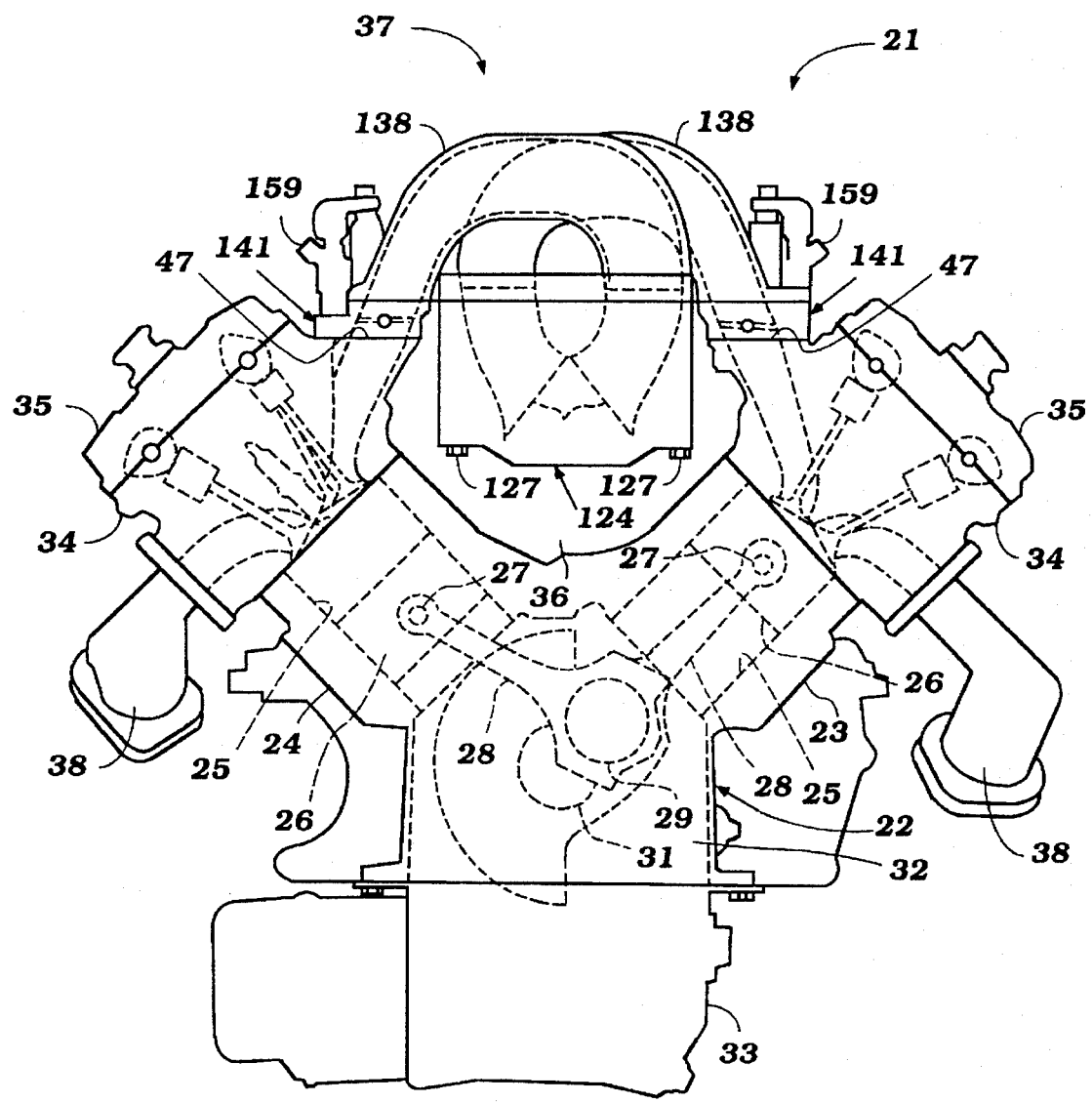
FIG. 1 is a front elevational view of an internal combustion engine constructed in accordance with an embodiment of the invention.

Referring now in detail to the drawings and initially to FIG. 1, an internal combustion engine constructed in accordance with an embodiment of the invention is indicated generally by the reference numeral 21. As will become apparent, the engine 21 is of the V-8 type and operates on a four-stroke principle. Although the invention is described in conjunction with such an engine, it will be readily apparent to those skilled in the art that certain facets of the invention may be employed with engines having other cylinder numbers and other cylinder configurations but the invention has primary application to V-type engines having their induction system in the valley between the cylinder banks. It is believed well within the scope of those skilled in the art to understand how the features of the invention may be employed with such other engines.

The engine 21 is comprised of a cylinder block, indicated generally by the reference numeral 22, having two angularly inclined cylinder banks 23 and 24, each of which is formed with four respective cylinder bores 25. In the illustrated embodiment, the angle between the cylinder banks 23 and 24 is 90°.

Pistons 26 are slidably supported within each of the cylinder bores 25. These pistons 26 are connected by means of piston pins 27 to the upper or small ends of respective connecting rods 28. As is typical with V-type engine practice, the cylinder bank 23 is staggered slightly in an axial direction relative to the cylinder bank 24 so that the connecting rods 28 of respective cylinders of the banks 23 and 24 can be journaled on common throws 29 of a crankshaft 31. The crankshaft 31 is rotatably journaled in a well-known manner within a crankcase chamber formed by a skirt 32 of the cylinder block 22 and a crankcase member 33 that is detachably affixed thereto in a known manner.

The construction of the cylinder block 22 and those components which are contained within it and the crankcase member 33 may be considered to be conventional. Since the invention deals primarily with the induction system to be described later, further details of the construction of the lower portion of the engine is not believed to be necessary to permit those skilled in the art to practice the invention. For that reason, further description of these conventional components will not be made.

Cylinder heads 34 are affixed to each of the cylinder banks 23 and 24 in a manner which will be described. Also, the detailed construction of the cylinder heads 34 and the mechanisms contained therein will be described by reference to FIG. 2. Cam covers 35 are affixed to the cylinder heads 34 in a manner which will also be described.

It should be noted that the cylinder banks 23 and 24 and the attached cylinder heads 34 and attached cam covers 35 define a valley between them, which valley is indicated generally by the reference numeral 36. An induction system, indicated generally by the reference numeral 37 and which also will be described later in more detail by reference to the remaining figures, is disposed in this valley 36 for supplying a fuel-air charge to the individual combustion chambers of the engine 21.

Exhaust manifolds 38 are affixed to the outer sides of the cylinder heads 34 and discharge the exhaust gases to the atmosphere through any conventional type of exhaust system (not shown).

The configuration of the combustion chambers for the invention will now be described by primary reference to FIG. 2. It should be initially noted that the cylinder heads 34 for each of the cylinder banks 23 and 24 are substantially identical in construction, with the cylinder head 34 for the bank 23 being placed onto the bank 23 in the in one orientation. When the same cylinder head 34 is attached to the cylinder bank 24, the head 34 will be reversed. This permits the use of a single casting for both sides of the engine 21 with obvious cost advantages.

The cylinder head 34 has a lower sealing surface 38 that is affixed to the upper end of the respective cylinder block 23 or 24 in a manner which will be described so as to effect a tight gas seal therewith. The cylinder head surface 38 is provided with individual recesses 39 which cooperate with the cylinder bores 25 and the heads of the pistons 26 to form the combustion chambers for the engine 21. In a preferred form, the combustion chambers have a generally lens-shaped configuration, as described in the copending application of Masaaki Yoshikawa, entitled "Engine Combustion Chamber and Air Intake Device," Ser. No. 08/354,539, filed Dec. 13, 1994, and assigned to the assignee hereof. Where any details of the combustion chamber configuration are not described herein, reference may be had to that copending application, the disclosure of which is incorporated herein by reference, for such details.

Figure 2:
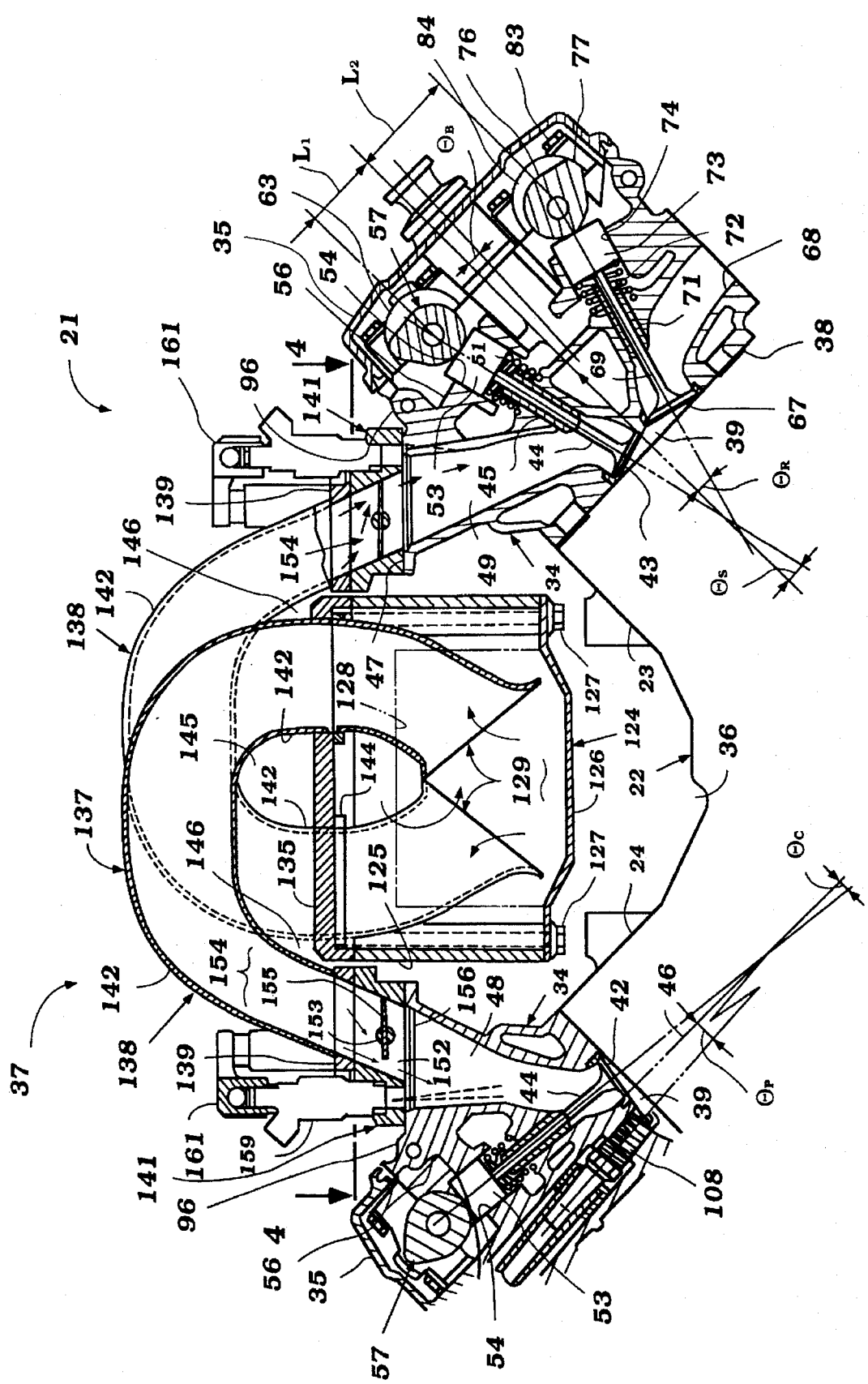
FIG. 2 is a partial cross-sectional view taken through the cylinder head and induction system for the engine along a plane that extends transversely and which passes through one cylinder bore of each bank.

The axes of the individual cylinder bores 25 are indicated in FIG. 2 and identified by the reference numeral 41 for orientation purposes. On one side of a plane containing the cylinder bore axis 41 there is provided a center intake valve seat 42, and this appears in FIG. 2 at the left-hand side of the figure. This intake valve seat 42 is disposed generally on the outer periphery of the cylinder bore 25 and is spaced the greatest distance from the cylinder bore axis 41.

A further, pair of side intake valve seats 43 are disposed closer to the cylinder bore axis 41, but are positioned so as to extend in part across the aforenoted plane containing the cylinder bore axis 41. These appear at the right side of FIG. 2.

Respective poppet-type intake valves 44 are slidably supported in the cylinder head 34 by pressed or cast-in guides 45 and control the flow through the valve seats 42 and 43. The reciprocal axis of the intake valve 44 associated with the center valve seat 42 is disposed at an acute angle $\theta_c$ to a plane 46, which plane is parallel to the cylinder bore axis 41 and to the aforenoted plane containing it. This plane 46 is offset from the plane containing the cylinder bore axis 41 toward the valley 36 between the cylinder banks 23 and 24.

The intake valves 44 associated with the side intake valve seats 42 have their reciprocal axes lying in a common plane. This plane is also disposed at an acute angle to the plane 46 and the plane for containing the axis 41. This acute angle, indicated by the dimension $\theta_s$, is greater than the acute angle $\theta_c$.

An intake passage arrangement, indicated generally by the reference numeral 46, extends from an outer surfaces 47 of the cylinder heads 34 on the side adjacent the valley 36 and is served by the intake system 37 in a manner which will be described. The intake passage arrangement 46 is Siamesed-type and serves all of the intake valve seats for each cylinder bore 25.

Coil compression springs 51 encircle the stems of the intake valves 44 and bear against machined surfaces on the cylinder head 34 and keeper retainer assemblies 52 fixed to the upper ends of the stems of the valves 44 for urging the valves 44 to their closed positions. Thimble tappets 53 are slidably supported in tappet-receiving bores 54 formed in a cylinder head 34 below an upper surface 56 for actuating the valves 44. The bores 54 are disposed at the same angle as the reciprocal axes of their respective valve stems 44.

An intake camshaft, indicated generally by the reference numeral 57, is rotatably supported in the cylinder head 34. This intake camshaft 57 is driven at one-half crankshaft speed. The intake camshaft 57 is provided with three cam lobes 58 for each cylinder which it serves and which are spaced apart by bearing surfaces. These bearing surfaces are, in turn, journaled in the cylinder head 54 in bearings formed integrally in the cylinder head and bearing caps 63. The basic construction of the cylinder head 34 and its architecture and the way in which the various components are formed and supported therein will not be described in this application further but reference may be had to the copending application of Tateo Aoyama and Masahiro Uchida, entitled "Cylinder Head Arrangement For Multi-Valve Engine," Ser. No. 08/363,417, and filed Dec. 23, 1994 and now U.S. Pat. No. 5,535,714, for any details of the construction of the cylinder head 34 which are not described herein. The disclosure of that application, which is assigned to the assignee hereof, is incorporated by reference.

Figure 3:
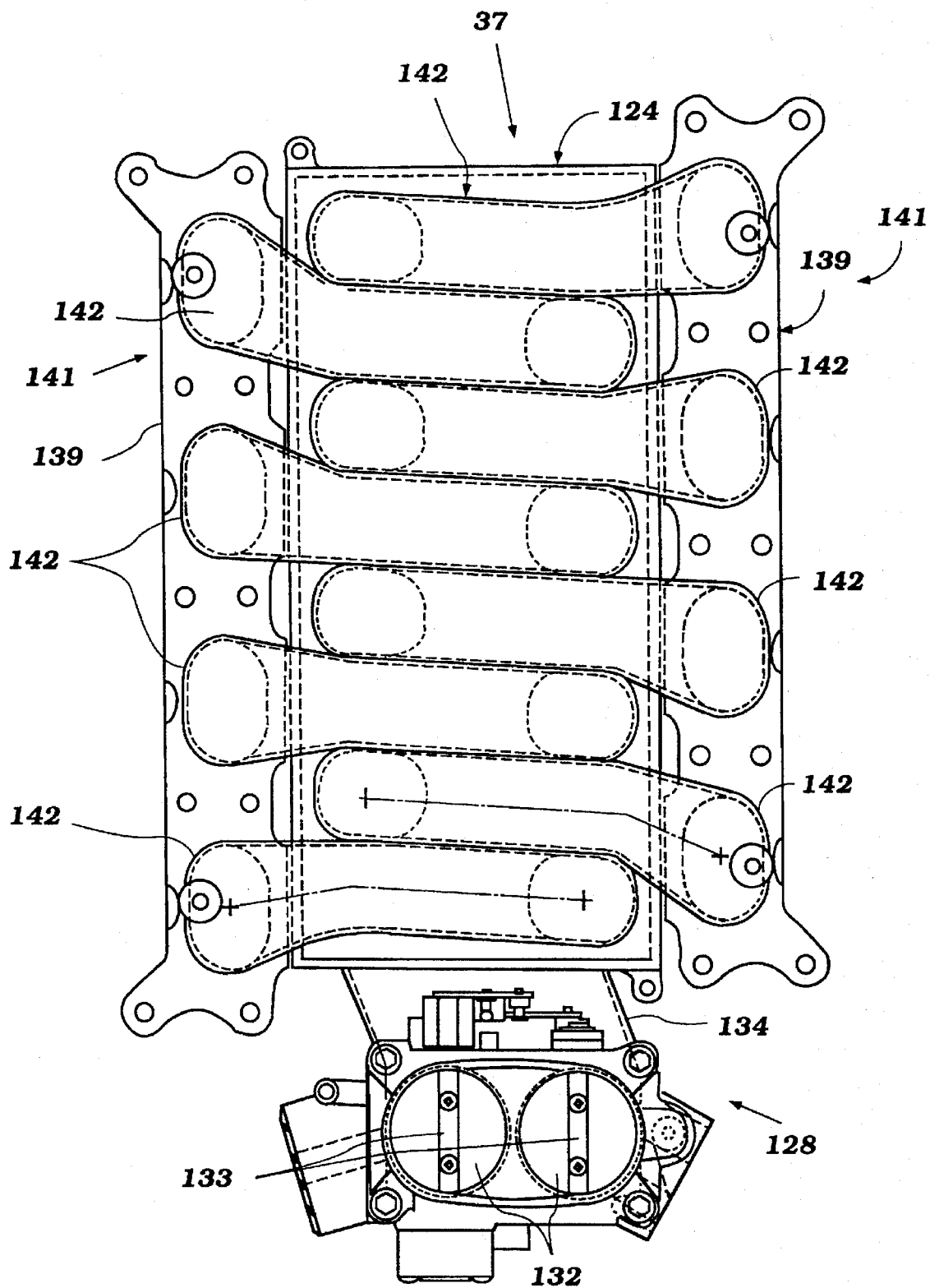
FIG. 3 is a top plan view of the intake manifold and throttle control for the engine.

Referring now primarily to FIGS. 2 and 3, a pair of exhaust valve seats 67 are formed in the cylinder head recesses 39 on the side of the plane 41 opposite to the center intake valve seat 42. These side exhaust valve seats 67 are formed at the beginning of exhaust passages 68, which extend through the exhaust side of the cylinder heads 34 and which terminate at the exhaust manifolds 38 previously referred to and illustrated in FIG. 1. The exhaust passages 68 may be of the Siamesed type, or if preferred, individual passages may be employed for each exhaust valve seat 67.

Exhaust valves 69 are slidably supported for reciprocation in the cylinder head 34 by valve guides 71 that are inserted into the cylinder head 34 in any suitable manner. The axes of reciprocation of the exhaust valves 69 lie in a common plane that is disposed at an angle $\theta_e$ to the plane containing the cylinder bore axis 41. The angle $\theta_e$ is less than or equal to the angle $\theta_s$ of the side intake valves and substantially greater than the angle $\theta_c$ of the center intake valve.

Coil compression springs 72 encircle the stems of the exhaust valves 69 and act upon keeper retainer assemblies for urging these valves to their closed position in seating engagement with the valve seat 67.

The exhaust valves 69 are opened by thimble tappets 73 that are slidably supported in bores 74 formed in the cylinder head 34. The bores 74 extend parallel to the axes of reciprocation defined by the valve guides 71 and extend downwardly from the cylinder head surface 56.

An exhaust cam shaft 76 is provided that has individual cam lobes 77 that engage each of the exhaust valve tappets 73 for operating them. The exhaust cam shaft 76 is journaled in the cylinder head 34 by means including threaded fastening means 83 for affixing bearing caps 84 to the cylinder heads 34 in the manner described in co-pending application Ser. No. 08/363,417.

As is well known in this art, the intake and exhaust cam shafts 57 and 76 are driven from the engine crankshaft 31 at one-half crankshaft speed. Although any of a wide variety of types of cam shaft drives may be employed, the drive may be of the type also disclosed in co-pending application Ser. No. 08/363,417. It will be noted that the axis of rotation of the intake camshaft 57 is disposed at a distance L1 from the plane containing the cylinder bore axis 41. This distance is less than the distance L2 from the plane to the axis of rotation of the exhaust camshaft 76.

Spark plug wells 107 are formed in major part on the exhaust sides of the cylinder heads 34. These spark plug wells 107 are inclined on the exhaust side of the cylinder head with the axis of the wells 107 being disposed at an angle $\theta_p$ to the plane containing the cylinder bore axis 41. This angle $\theta_p$ is less than the angle $\theta_e$ at which the exhaust valves 69 are inclined to this same plane. The lower ends of the wells 107 have tapped openings to receive spark plugs 108.

The induction system 37 for the engine will now be described by primary reference to FIGS. 1–7. As has been noted, this induction system 37 is positioned in the valley 36 between the cylinder banks 23 and 24 and cooperates with the cylinder head surfaces 47 for supplying a fuel air charge to the induction passages 46 of the cylinder heads 34.

The induction system 37 includes a plenum chamber, indicated generally by the reference numeral 124 and which extends generally longitudinally of the engine through the valley 36. The plenum chamber 124 is spaced from the cylinder block 22 and cylinder heads 34 so as to define an air path therearound through which air can circulate for cooling. This improves the volumetric efficiency of the engine.

The plenum chamber 124 is formed from a box-like member 125 that has its open lower face closed by a closure plate 126 that is affixed thereto by threaded fasteners 127 (FIG. 2). A throttle body 128 (FIGS. 3–6) is affixed to the front of the plenum chamber 124 and supplies air to its interior 129. The throttle body 128 receives air from a suitable air inlet device (not shown) and has an inlet opening 131 in which a pair of flow controlling throttle valves 132 are supported for rotation on respective throttle shafts 133. The throttle valves 132 are operated by a suitable external accelerator control and open in unison.

The throttle body 128 has a curved section 134 downstream of the throttle valves 133 and which blends into the plenum chamber 124 so as to deliver the air to its internal chamber 129. Various types of sensors such as a temperature sensor and/or air flow sensor (not shown) may be associated with the throttle body 128 for sensing the condition and volume of the air inducted.

The upper end of the box-like member 125 is closed by a top plate 135 which is affixed thereto also by the fasteners 127 and further fasteners 136. This top plate 135 forms the terminal end of an intake manifold assembly, indicated generally by the reference numeral 137 and which includes a plurality of runner sections, indicated generally by the reference numeral 138 which all have common flanges 139 that are affixed to a control valve assembly, indicated generally by the reference numeral 141 at each cylinder head surface 47. From the flanges 139, the runner sections 138 include tubular portions that extend upwardly and then transversely across the valley 36 and turn downwardly at a reentrant portion 142 that enters the plenum chamber 124 through the plate 136 adjacent the opposite cylinder bank.

Intake trumpets 143 of tuned lengths have flange portions 144 that are affixed to the underside of the plenum chamber plate 135 and extend into the plenum chamber volume 129. The length of the trumpets 143 and runners 138 and their cross sections is chosen to provide optimum efficiency for the engine induction. The air flows through the induction system as shown by the arrows in FIG. 2.

It should be noted that the manifold runners 138 are spaced from each other and define an air gap 145 (FIG. 2) so that air can flow both across the top of the plenum chamber 124 and around the manifold runners 138 for their cooling. Further air flow recesses 146 are formed on the outer peripheral sides of the reentrance sections 142 of the runner tubes of the runners 138.

Although it is not a functional part of the plenum chamber 124, the plenum chamber unit 124 also provides a mounting cavity 147 on each side thereof in which a respective knock sensor 148 is positioned. The knock sensors 148 are employed in conjunction with the ignition control system for the engine for controlling the ignition timing to prevent or retard knocking conditions. Since this structure forms no part of the invention, a further description of it is not believed to be necessary.

Figure 4:
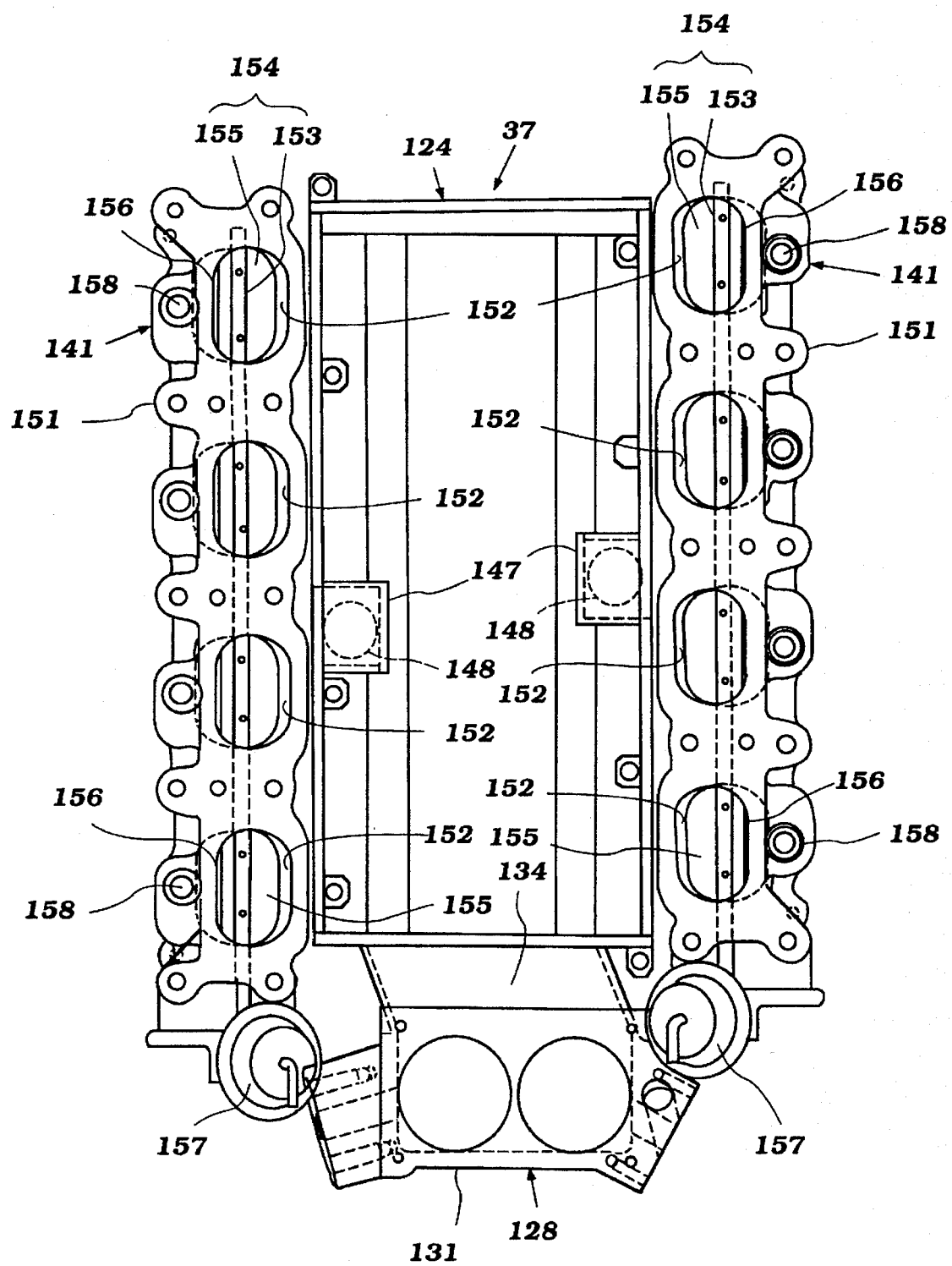
FIG. 4 is a view of the intake manifold and control valve assembly taken along the line 4—4 of FIG. 2.
Figure 5:
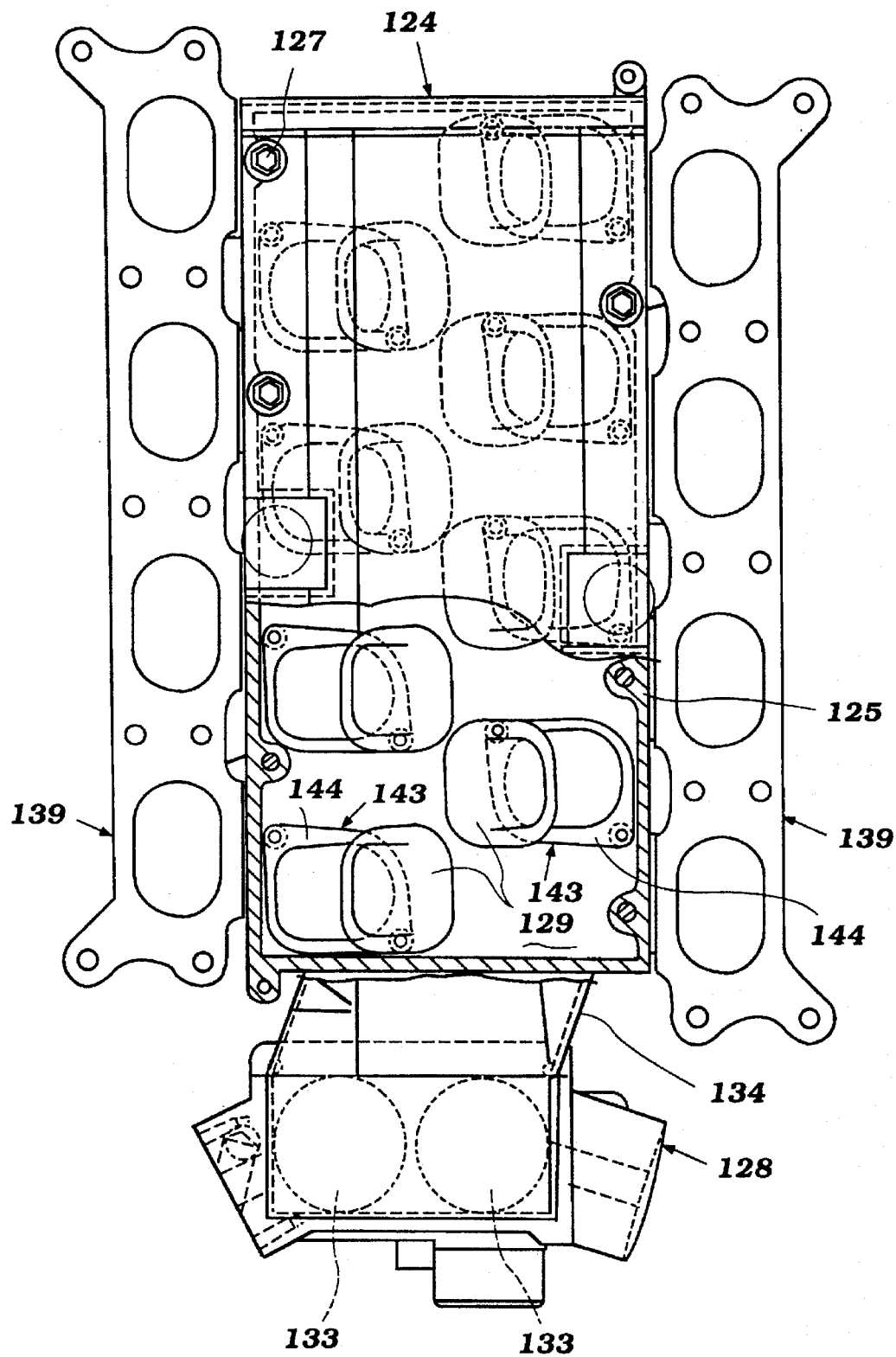
FIG. 5 is a bottom plan view, with a portion broken away, of the structure shown in FIG. 4, but deleting the flow-controlling valves and showing the interior configuration of the plenum chamber for the intake manifold.
Figure 6:
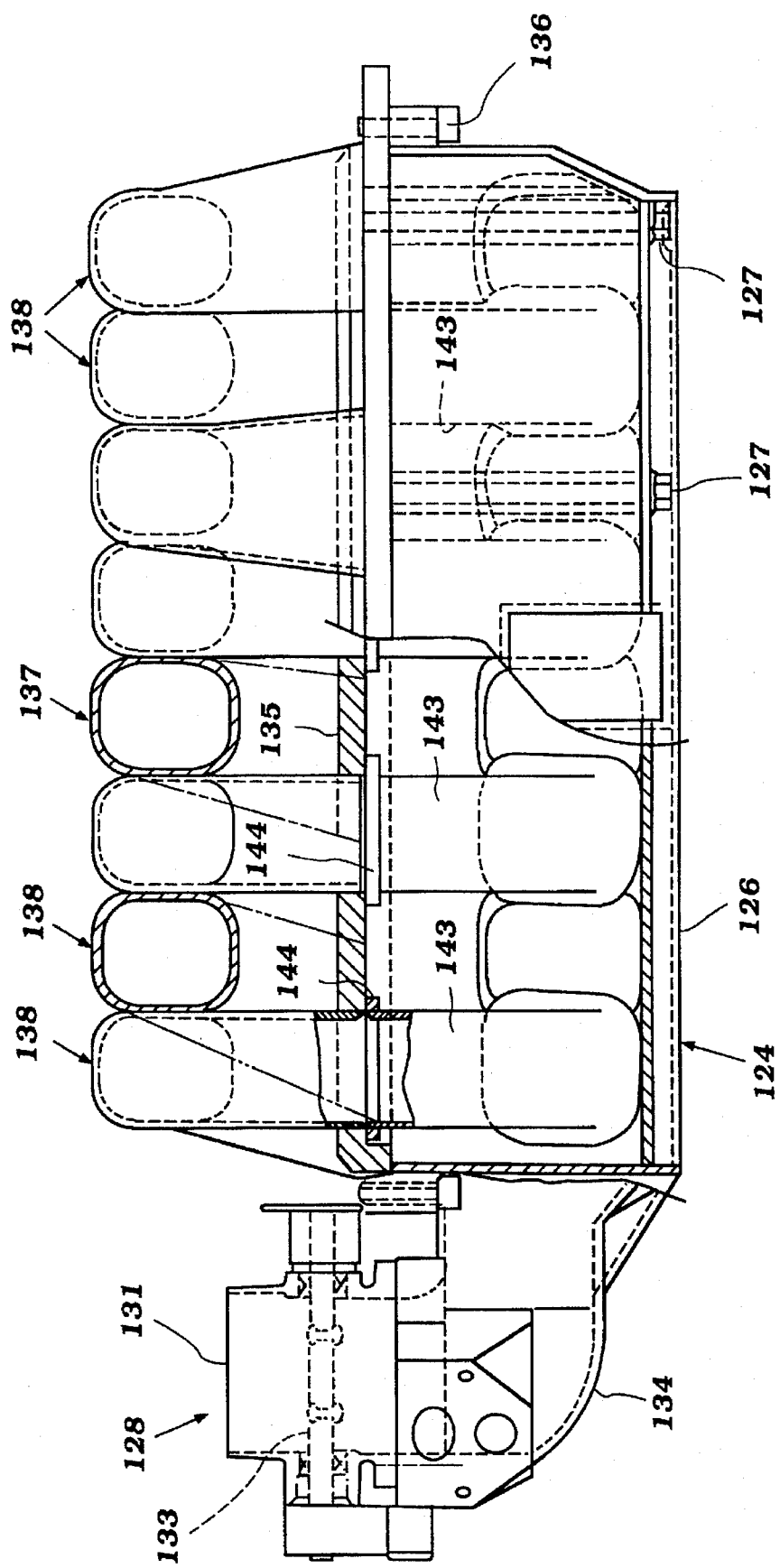
FIG. 6 is an enlarged side elevational view of the intake manifold and throttle valve assembly, with a portion broken away and shown in section.
Figure 7:
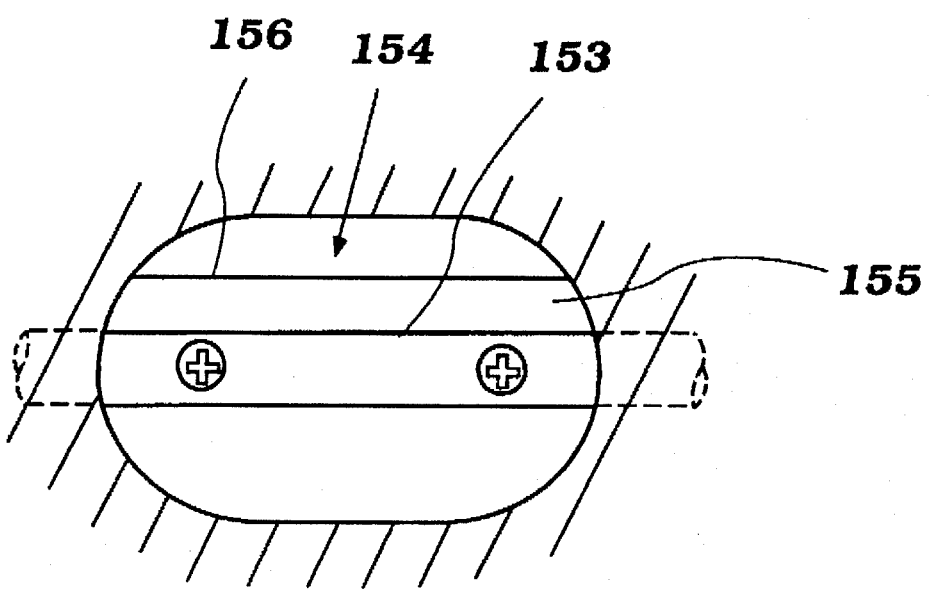
FIG. 7 is an enlarged cross-sectional view showing one of the flow-controlling valves.
Figure 8:
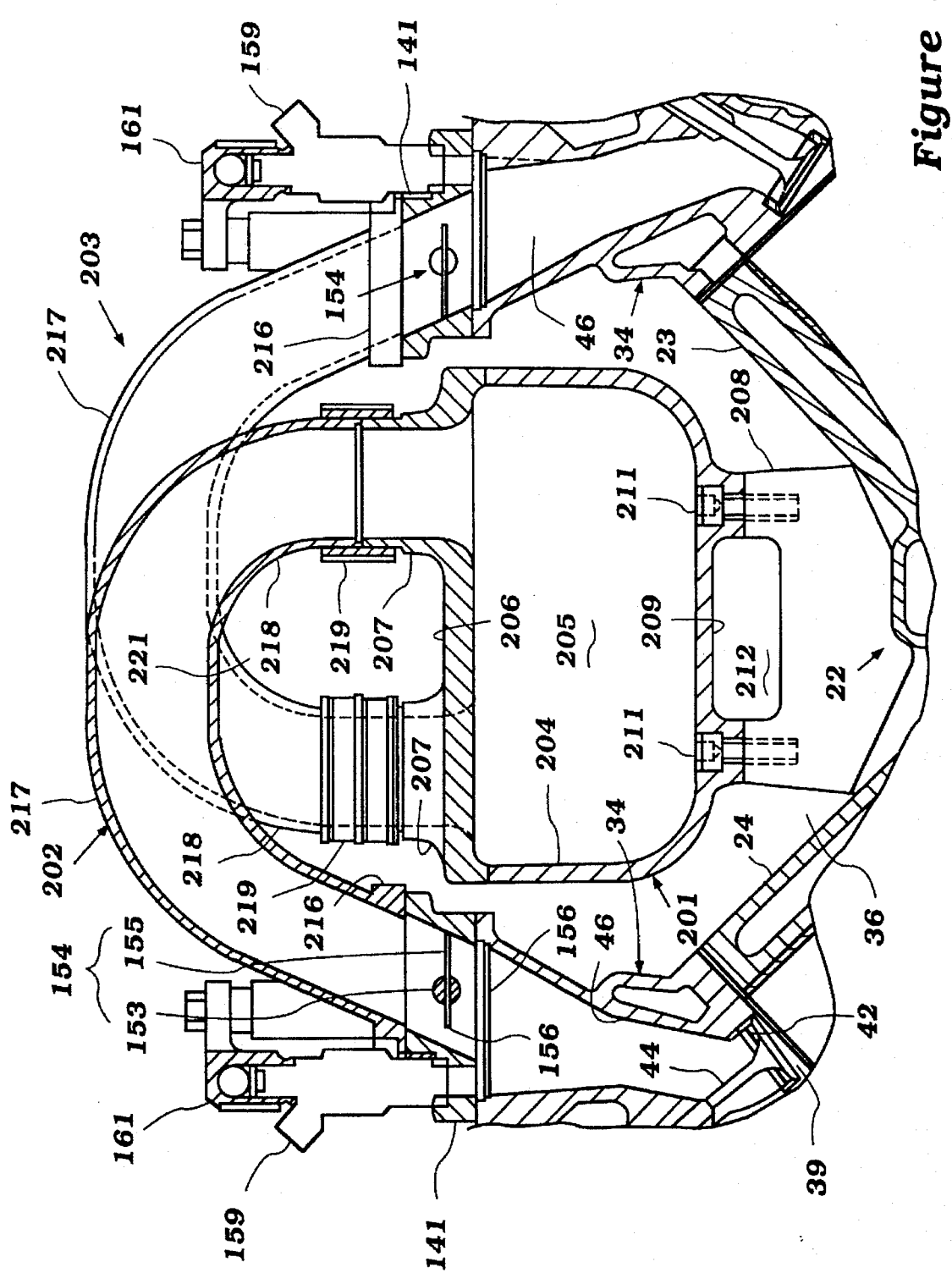
FIG. 8 is a view in part similar to FIG. 2 but on a larger scale and showing another embodiment of the invention.
Figure 9:
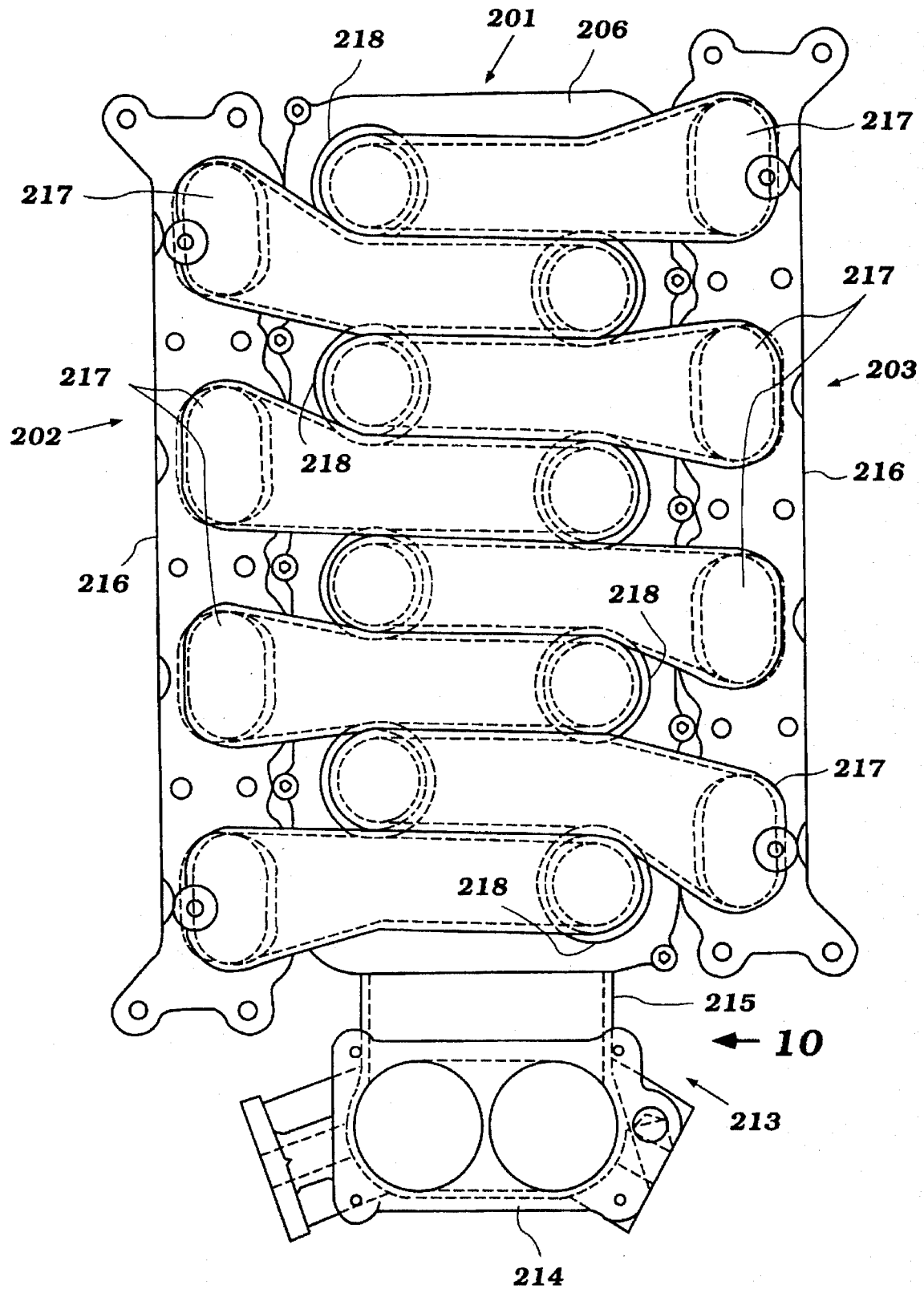
FIG. 9 is a view, in part similar to FIG. 3, but for the embodiment of FIG. 8 and deletes the main flow controlling throttle valves.
Figure 10:
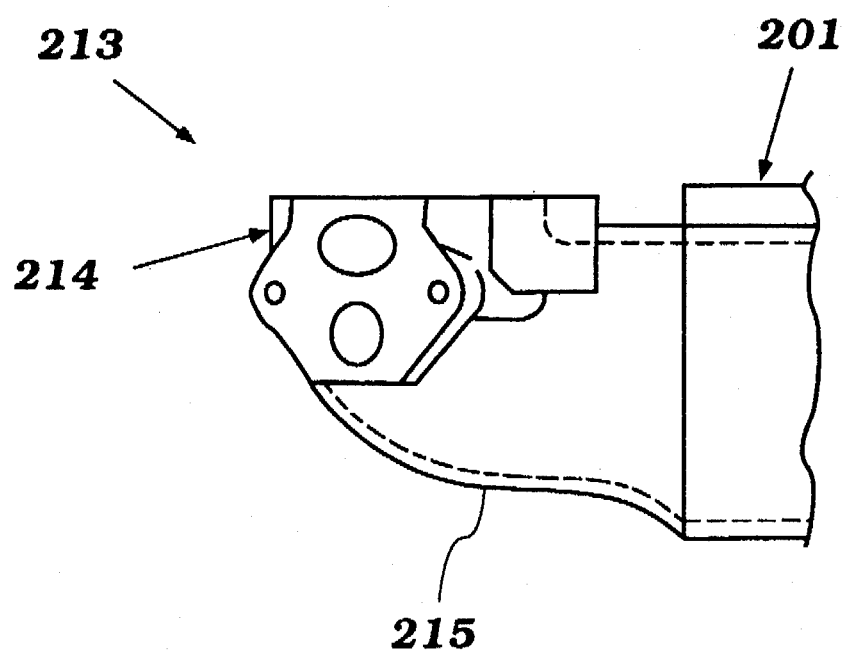
FIG. 10 is a view looking generally in the direction of the arrow 10 of the FIG. 9.

The construction of the control valve assemblies 141 will now be described by reference to FIGS. 2, 4 and 7. It should be noted that the induction system 37 as thus far described and the configuration of the cylinder head induction passages 46 are such that the charge that enters the combustion chambers will flow relatively smoothly and with a relatively small amount of turbulence. This, however, may give rise to poor or low speed running characteristics wherein turbulence is desirable.

The control valve assemblies 141 are employed so as to redirect the charge and give a turbulence factor to it. The control valve assemblies 141 each include a valve body 151 which, as has been noted, is interposed between the manifold runners 138 and the induction passages 46 of the cylinder heads 34. This body 151 is formed with flow passages 152 that are generally complementary to the configuration of the shape of the intake passages 46 and specifically their shape in the cylinder head surfaces 47.

A control valve shaft 153 of a control valve assembly 154 is journaled in each body 151 and extends transversely across the passages 152. Plate-type control valves 155 are affixed to this shaft 153 and complete the control valve assembly 154. It should be noted that the plate-type valves 155 are provided with cut-outs 156 that are disposed on one side thereof. Hence, when the control valve assembly 154 is in its closed position, as shown in FIG. 2, the intake charge flowing through the induction system 37 will be directed toward the side of the valve seats 42 and 43 closest to the cylinder bore axis 41. This will then cause the air to enter the combustion chambers and specifically the combustion chamber recesses 39 in a direction to create a tumble motion in the cylinders.

Vacuum-type servo motors 157 are affixed to the ends of the valve bodies 151 and are operated by a suitable ECU or other control arrangement so as to close the valve assemblies 154 at low and mid-range speeds so as to generate this turbulence. At high speed and high loads, however, the control valves 154 are positioned in their full open position and hence will generate little restriction to air flow and maximum volumetric efficiency.

Finally, the control valve assembly 141 and specifically the valve body 151 is provided with a plurality of injection nozzle openings 158 which receive suitable fuel injectors such as electrically operated fuel injectors 159. The fuel injectors 159 are fed by fuel rails 161 and spray fuel into one side of the intake passages 48 and 49. This spray is on the side where the cutout 156 of the control valves 155 is positioned so that when the control valve assembly 154 is in its tumble-generating position as shown in FIG. 2, the turbulent air flow will pass the spray from the nozzles 159 and effect good fuel/air mixing.

Another embodiment of the invention is shown in FIGS. 8-11. This embodiment differs from the previously described embodiment only in the construction of a portion of the induction system consisting of the plenum chamber, indicated generally by the reference numeral 201, and the intake manifolds which form two separate sections, indicated by the reference numerals 202 and 203, respectively. All other components of the engine are the same and for that reason these components have been identified by the same reference numerals and will be described again only insofar as they relate to the construction of this embodiment.

In this embodiment, the plenum chamber 201 is formed by a generally open top box-shape member 204 that defines a longitudinally extending plenum chamber volume 205. The upper end of the volume 205 is closed by a closure plate 206 that is affixed thereto in any suitable manner and which has a plurality of upstanding nipple portions 207.

In this embodiment, the cylinder block 22 is provided with a pair of upstanding walls 208 to which a lower wall 209 of the plenum chamber portion 204 is affixed by a plurality of socket headed screws or other fasteners 211. The plenum chamber 201 is spaced inwardly from the cylinder block 22 and cylinder heads 34 so that the air volume 36 still extends around it for cooling purposes. In addition, the walls 208 are formed with cutouts 212 that also permit air to flow for cooling purposes along the lower wall 209.

A throttle valve assembly, indicated generally by the reference numeral 213 (FIG. 9) and having a body portion 214 in which throttle valves (not shown) are provided controls the air flow into the plenum chamber 201 as with the previously described embodiment. This throttle body 213 has a curved section 215 that communicates with the plenum chamber volume 205 so as to admit atmospheric air thereto.

As noted, there are provided two intake manifolds 202 and 203 and each of these intake manifolds is the same in configuration. Like the cylinder heads 34, they are bolted to their corresponding cylinder heads in a reverse direction.

Figure 11:
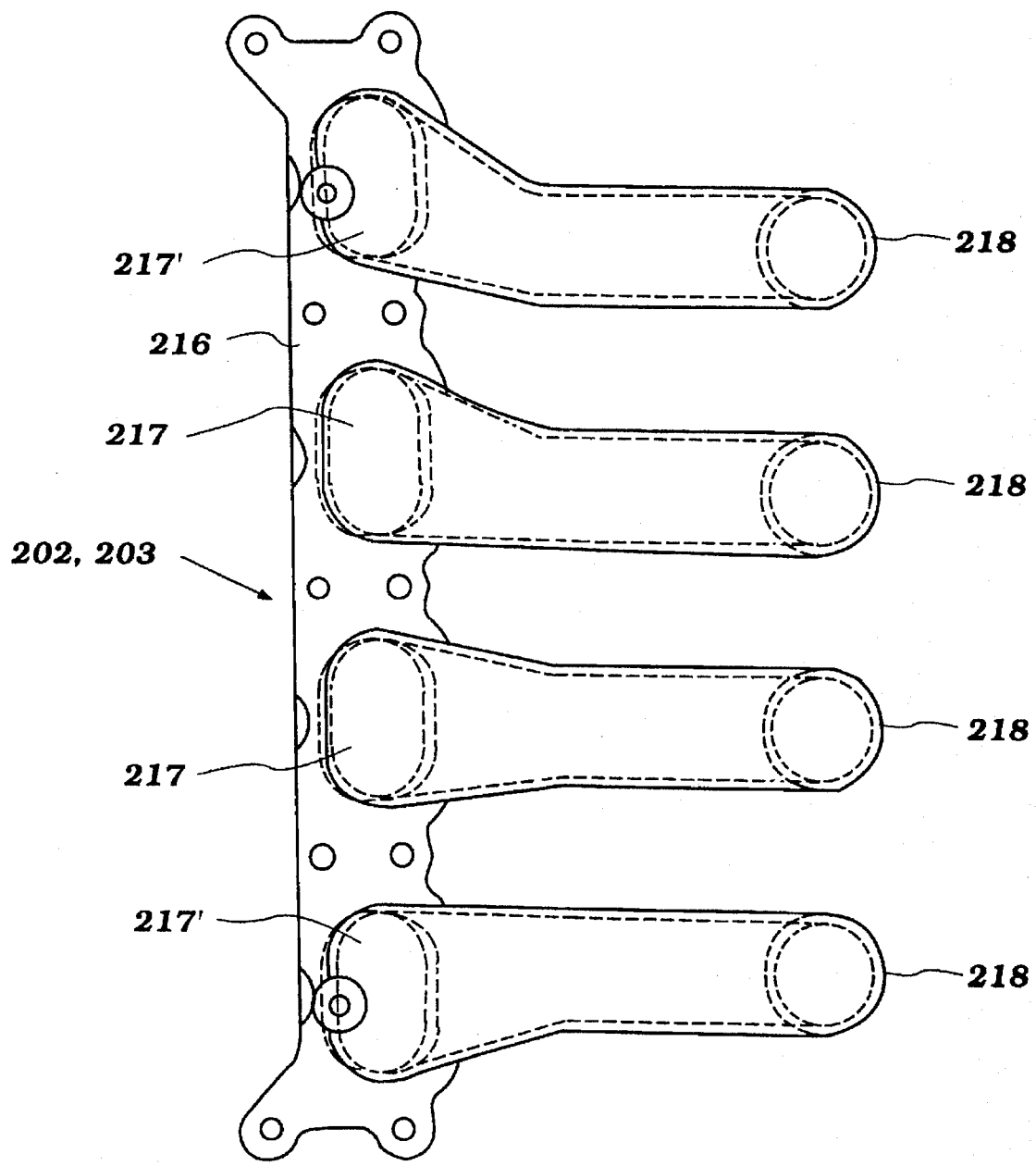
FIG. 11 is a top plan view showing the manifold associated with one of the cylinder banks.

FIGS. 11 and 12 show the individual intake manifolds with the manifold 202 being shown in the orientation of the manifold 202. Each manifold 202 and 203 includes a flange portion 216 that has a plurality of inlet openings that are corresponding in size and shape to the openings in the control valve assembly 141 and which are affixed thereto in any known manner.

Individual manifold runners 217 extend from the openings in the flange 216 and upwardly and transversely away from the respective cylinder head 34 toward the opposite cylinder bank. Adjacent the peripheral age of the plenum chamber 201 adjacent the opposing cylinder bank, the runners 217 have reentrant portions 218 that curve downwardly and are aligned with the respective nipples 207 of the plenum chamber 201 adjacent the opposite cylinder bank. These reentrant portions 218 are affixed in flow establishing relationship with the nipples 217 through flexible conduits 219. These flexible conduits 219 permit some relative movement to absorb vibrations.

As with the previously described embodiment, a longitudinally extending air gap 221 extends between the completed manifold plenum chamber arrangement and the individual runners sections 217 so as to provide adequate cooling of this embodiment.

It should be readily apparent from the foregoing description that the described embodiments of the invention provide a very effective and compact induction system for a V-type engine and also one in which the intake manifold and associated plenum chamber can received copious amounts of air for cooling. Of course, the foregoing description is that of preferred embodiments of the invention and various changes and modifications may be made without departing from the spirit and scope of the invention, as defined by the appended claims.

I claim:

1. An induction system for an engine having a pair of angularly disposed cylinder banks, each having at least two cylinder bores formed therein, said cylinder banks defining a valley between them, each cylinder bank having a plurality of intake ports for the cylinder bores therein formed adjacent said valley, a plenum chamber extending through said valley and spaced from said cylinder banks for forming a cooling air flow path therearound, said plenum chamber being comprised of a generally open topped body closed by an upper closure plate, a first series of intake pipes extending from the intake ports of one of said cylinder banks into said plenum chamber through said upper closure plate, and a second series of intake pipes extending from the intake ports of the other of said cylinder banks into said plenum chamber through said upper closure plate, said intake pipes being all spaced from each other for providing a cooling air flow path therebetween.

2. An induction system for an engine as in claim 1, wherein the intake pipes each terminate in the plenum chamber upper closure plate on the side adjacent the cylinder bank opposite that from which they originated.

3. An induction system for an engine as in claim 1, further including extension tuning trumpets affixed within the plenum chamber on the underside of the upper closure plate at the ends of the respective intake pipes for extending the effected length of the intake pipes.

4. An induction system for an engine as in claim 3, wherein all of the intake pipes have the same effective length.

5. An induction system for an engine as in claim 4, further including means providing an atmospheric air inlet into the plenum chamber.

6. An induction system for an engine as in claim 5, wherein the atmospheric air inlet is formed at one end of the plenum chamber.

7. An induction system for an engine as in claim 6, wherein the atmospheric air inlet is provided with a flow controlling throttle valve for controlling the flow into the plenum chamber.

8. An induction system for an engine as in claim 7, wherein the flow controlling throttle valve comprises a pair of parallel acting simultaneously activated throttle valves.

9. An induction system for an engine as in claim 8, wherein the throttle valves are positioned in side-by-side relationship.

10. An induction system for an engine as in claim 1, wherein each intake pipe has provided in it a respective control valve moveable between an open position wherein the flow into the cylinder bore is substantially unrestricted and a closed position wherein the flow into the cylinder bore is directed in a different direction for generating turbulence in the combustion chamber.

11. An induction system for an engine as in claim 10, wherein the cylinder banks include cylinder heads in which the intake ports are formed and wherein the control valves are disposed between the cylinder heads and the intake pipes.

12. An induction system for an engine as in claim 11, wherein the control valves when in their closed position generate a tumble action within the combustion chamber.

13. An induction system for an engine as in claim 12, wherein each cylinder bore is provided with three intake valve seats served by the intake port.

14. An induction system for an engine as in claim 13, wherein the intake ports are siamesed to provide one inlet opening for each cylinder bore, which inlet opening cooperates with the control valve.

15. An induction system for an engine as in claim 1, wherein each cylinder bore is served by three intake valve seats.

16. An induction system for an engine as in claim 15, wherein each intake pipe has provided in it a respective control valve moveable between an open position wherein the flow into the cylinder bore is substantially unrestricted and a closed position wherein the flow into the cylinder bore is directed in a different direction for generating turbulence in the combustion chamber.

17. An induction system for an engine as in claim 16, wherein the cylinder banks include cylinder heads in which the intake ports are formed and wherein the control valves are disposed between the cylinder heads and the intake pipes.

18. An induction system for an engine as in claim 17, further including extension tuning trumpets affixed within the plenum chamber on the underside of the upper closure plate at the ends of the respective intake pipes for extending the effected length of the intake pipes.

19. An induction system for an engine as in claim 18, wherein all of the intake pipes have the same effective length.

20. An induction system for an engine as in claim 19, further including means providing an atmospheric air inlet into the plenum chamber.

21. An induction system for an engine as in claim 20, wherein the atmospheric air inlet is formed at one end of the plenum chamber.

22. An induction system for an engine as in claim 21, wherein the atmospheric air inlet is provided with a flow controlling throttle valve for controlling the flow into the plenum chamber.

23. An induction system for an engine as in claim 22, wherein the flow controlling throttle valve comprises a pair of parallel acting simultaneously activated throttle valves.

24. An induction system for an engine as in claim 23, wherein the throttle valves are positioned in side-by-side relationship.

25. An induction system for an engine as in claim 24, wherein the control valves when in their closed position generate a tumble action within the combustion chamber.

* * * * *